Dec. 10, 1957   F. J. BECKER   2,815,965
HITCH MEANS OF THE AUTOMATIC COUPLING TYPE
Filed Aug. 30, 1954
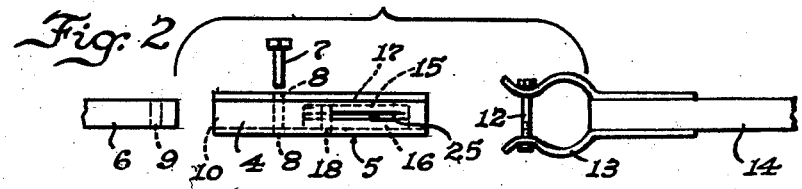
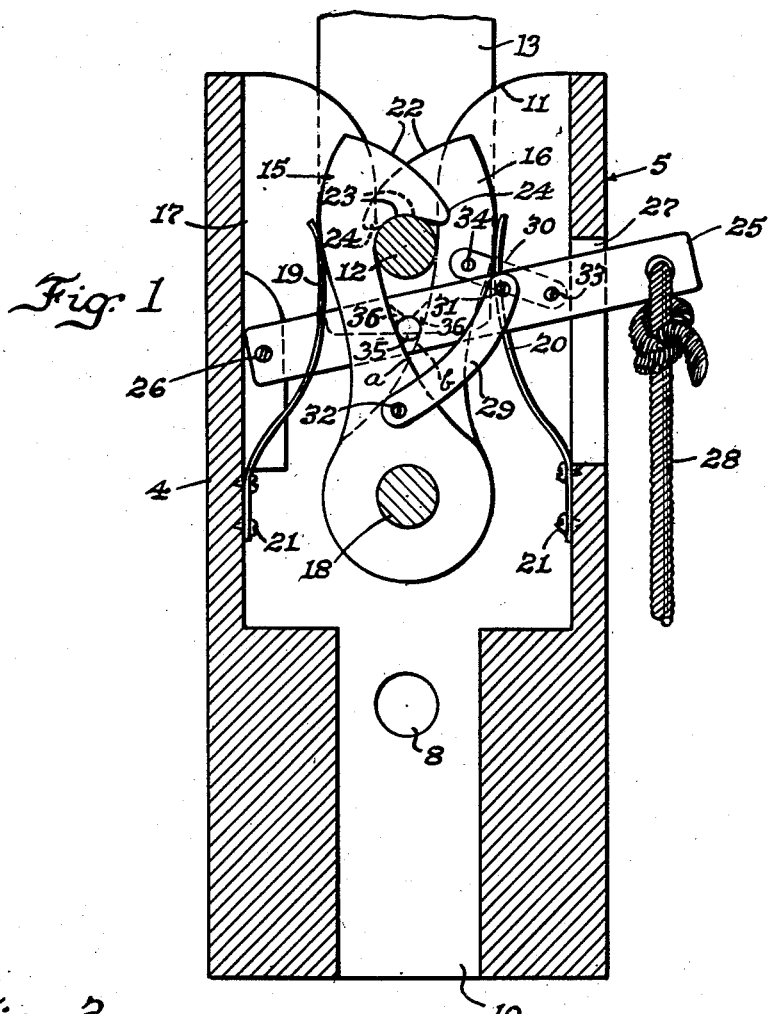
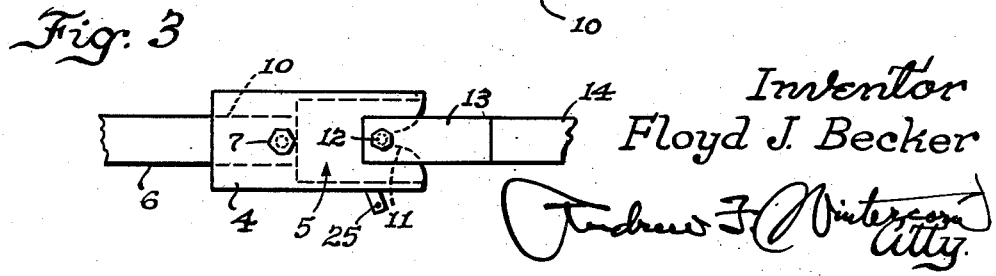
Inventor
Floyd J. Becker United States Patent Office 2,815,965
Patented Dec. 10, 1957

2,815,965
HITCH MEANS OF THE AUTOMATIC COUPLING TYPE

Floyd J. Becker, Rockford, Ill.

Application August 30, 1954, Serial No. 453,110

8 Claims. (Cl. 280—510)

This invention relates to hitch mechanisms designed especially for the coupling of agricultural implements to tractors, but adapted for use generally in the coupling of vehicles.

The principal object of my invention is to provide a hitch mechanism of simple, economical, and practical design, and one which is positive both in coupling and uncoupling and is not apt to get out of order.

A salient feature of the hitch mechanism of my invention is the fact that the two hook-shaped jaws, which are spring pressed normally toward each other to coupling position, are conformed on their outer ends to provide cam surfaces, which when engaged by the coupler pin cause the jaws to be forced apart against the spring pressure to admit the pin as the tractor backs up to the implement to be coupled, the two jaws being connected by links to a manually operable lever so as to permit positively moving the jaws apart by a pull on the lever when the implement is to be uncoupled.

The invention is illustrated in the accompanying drawing, in which—

Fig. 1 is a longitudinal section through a coupling mechanism made in accordance with my invention;

Fig. 2 is a side elevation of the mechanism on a smaller scale shown in disassembled relationship to a tractor drawbar and the tongue of an agricultural implement, or other trailing vehicle, to be coupled to the tractor, and Fig. 3 is a plan view of the coupling mechanism as it appears attached to the drawbar with the implement tongue coupled thereto.

The same reference numerals are applied to corresponding parts.

Referring to the drawing, the housing 4 of the hitch mechanism 5 is adapted to be mounted rigidly, but detachably, on the end of a tractor drawbar 6, so that the mechanism can be readily removed from one tractor and applied to another. A bolt 7, which passes through holes 8 in the top and bottom of the housing 4 and through a registering hole 9 in the drawbar, is the only part requiring removal to enable removal of the hitch mechanism. A guideway 10 is provided in the front end of the housing 4 to accommodate the rear end of the drawbar. The rear end of the housing 4 is cut away to provide a V-shaped crotch 11 to receive the coupler pin or bolt 12 provided in the clevis 13 on the front end of the tongue 14 of an agricultural implement, or other vehicle, to be pulled when coupled to the drawbar by means of the hitch mechanism 5.

The hitch mechanism comprises two hook-shaped jaws 15 and 16 disposed above one another and with their hooks in opposed relation in a chamber 17 provided in the rear end of the housing 4. A vertical pin 18, mounted in the inner end of the chamber 17, provides a common pivot for the two jaws, and leaf springs 19 and 20 which are mounted in the chamber 17, as indicated at 21, have their free ends engaging the backs of the jaws 15 and 16, respectively, to urge them normally toward each other to coupling position from opposite sides of the crotch 11, whereby to hook onto the coupler pin 12, as shown in Fig. 1, when it is engaged in the inner end of the crotch 11. The cam surfaces 22 on the outer ends of the jaws are disposed in inwardly converging relation, so that when the tractor is backed up toward the tongue of an implement to be coupled and the coupler pin 12 engages these surfaces, the jaws are forced apart under cam action against the action of the leaf springs 19 and 20 to admit the pin 12, and when the pin 12 has arrived at the inner end of the crotch 11, the jaws are closed under spring pressure and hooked onto the pin to complete the coupling operation. The concave form of the inner sides 23 of the hooks 24 on the jaws 15 and 16 insures their remaining engaged on the pin 12, because, then, the cam action is in the direction of urging the jaws toward each other instead of away from each other, so that the springs 19 and 20 need not be relied upon entirely to maintain the connection, although they do play an important part in that respect. A lever 25, which extends in transverse relation to and between the jaws 15 and 16 intermediate the ends thereof, is pivoted at its inner end in the chamber 17, as indicated at 26, and extends outwardly through a slot 27, and the outer end has a rope 28 attached thereto and extending to the driver's seat on the tractor, so that the lever can be pulled to uncouple an implement or other trailing vehicle. Links 29 and 30 pivotally connect the lever 25 with the jaws 15 and 16 in such a way that clockwise movement of the lever 25 through about twenty degrees (20°) causes positive movement of the jaws apart far enough for withdrawal of the coupler pin 12 from the crotch 11, the jaw 15 swinging in a counterclockwise direction and the jaw 16 in a clockwise direction. It will be noticed that the link 29 is the longer one of the two and is pivotally connected at one end to one side of the lever, as at 31, and extends inwardly from the lever and is pivotally connected at its other end, as at 32, to the jaw 15 near its pivoted end. The shorter link 30 is pivotally connected at one end to the lever 25 on its other side, as indicated at 33, and extends outwardly with respect to the lever and is pivotally connected to the jaw 16, as at 34, near the outer end of said jaw. A vertical pin 35 mounted on the lever 25 intermediate the ends thereof lies in the crotch defined between the jaws 15 and 16 and serves to limit the inward movement of the jaws toward one another after the coupler pin 12 has been withdrawn, whereby to insure correct disposition of the outer ends of the jaws for the subsequent coupling operation.

In operation, the coupler pin 12 sliding on the cam-shaped ends 22 of the jaws 15 and 16 as the tractor is backed up toward an implement or vehicle to be coupled forces the jaws apart as the pin 12 slides into the crotch 11. Then, when the pin 12 reaches the inner end of the crotch 11, the jaws are closed automatically under the action of the springs 19 and 20. Once the jaws have closed, there is no danger of the trailing vehicle becoming uncoupled, because the jaws are held in closed position by the springs and are, furthermore, cammed toward closed position by the cam-shaped inner sides 23 of the hooks 24 on the jaws. To uncouple the trailing implement or vehicle, it is only necessary for the operator to pull the rope 28 and thereby swing the lever 25 forwardly, that is, in a clockwise direction as viewed in Fig. 1. The lever by reason of its link connections at 29 and 30 with the jaws forces the jaws apart positively against the resistance of the springs 19 and 20. After the uncoupling operation, the lever 25 is returned automatically to the position shown in Fig. 1 under action of the springs 19 and 20 active against the jaws.

In conclusion, it will be evident that a practical modification of the present invention, more or less evident from a study of Fig. 1, is one in which the inner longitudinal edges *a* and *b* of the jaws 15 and 16, respectively, serve by sliding engagement of the pin 35 thereon to force the jaws apart when the lever 25 is pulled by means of rope 28. In that case, stop projections, like those indicated in dotted lines at 36, should be provided for limiting abutment by pin 35, because links 29 and 30 are omitted when the pin 35 operates the jaws by such cam action.

It is believed the foregoing description conveys a good understanding of the objects and advantages of my invention. The appended claims have been drawn to cover all legitimate modifications and adaptations.

I claim:

1. In a hitch mechanism, a housing providing a chamber therein having top and bottom walls in which a V-crotch entrance is provided for reception of a coupler pin, two elongated hook-shaped jaw members pivoted in said chamber and swingable toward one another from opposite sides of the V-crotch to confine a coupler pin in the inner end thereof, spring means urging said jaw members toward one another to operative position, the outer ends of said jaw members having cam surfaces in inwardly converging relation which, when slidably engaged by a coupler pin entering the V-crotch in a coupling operation, cause the jaw members to be forced apart against the resistance of said spring means to admit the coupler pin to coupled position, whereupon the jaw members close under spring pressure to retain said coupler pin in said V-crotch, a lever disposed in said chamber in transverse relation to said jaw members and pivoted with respect to said housing and extending therefrom for manual oscillation, and two links pivotally connected at one end to said lever, one of said links being pivotally connected at its free end to one of said jaw members near its pivoted end to swing it one way positively to retracted position upon uncoupling movement of said lever, and the other of said links being pivotally connected at its free end to the other of said jaw members remote from its pivoted end to swing it in the opposite direction with respect to the companion jaw member positively to retracted position upon uncoupling movement of said lever, said lever being thereafter returned to coupling position by said jaw members under the pressure of said spring means.

2. A hitch mechanism as set forth in claim 1 including stop means on said lever arranged to engage said jaw members to limit movement thereof toward one another, whereby in the absence of a coupler pin in the V-crotch said jaw members are disposed in a predetermined position relative to said V-crotch in readiness for entry of a coupler pin.

3. In a hitch mechanism, a housing providing a chamber therein having top and bottom walls in which a V-crotch entrance is provided for reception of a coupler pin, two elongated hook-shaped jaw members pivoted in said chamber and swingable toward one another so that their hooks extend past one another in overlapping relationship from opposite sides of the V-crotch to confine a coupler pin in the inner end thereof, spring means urging said jaw members toward one another to operative position, the outer ends of said jaw members having cam surfaces in inwardly converging relation which, when slidably engaged by a coupler pin entering the V-crotch in a coupling operation, cause the jaw members to be forced apart against the resistance of said spring means to admit the coupler pin to coupled position, whereupon the jaw members close under spring pressure to retain said coupler pin in said V-crotch, a lever disposed for oscillation in said chamber in transverse relation to and between said jaw members and pivoted at its inner end with respect to said housing and extending therefrom for manual oscillation, and a pin on said lever intermediate its ends disposed substantially at right angles to the planes of said jaw members having one end portion slidably engaging on one side the inner longitudinal edge portion of one of said jaw members, and having the other end portion slidably engaging on the other side the inner longitudinal edge portion of the other jaw member, said jaw members being pivoted on a common axis and said inner longitudinal edge portions being in inwardly converging relationship so that when said lever is pulled to uncoupling position said pin forces said jaw members apart, said lever being thereafter returned to coupling position by said jaw members under the pressure of said spring means.

4. A hitch mechanism as set forth in claim 3 including stop projections on said inner longitudinal edge portions for abutment by said pin to limit closing movement of said jaws.

5. In a hitch mechanism, a housing providing a chamber therein having top and bottom walls in which a V-crotch entrance is provided for reception of a coupler pin, two elongated hook-shaped jaw members pivoted in said chamber and swingable toward one another so that their hooks extend past one another in overlapping relationship from opposite sides of the V-crotch to confine a coupler pin in the inner end thereof, spring means urging said jaw members toward one another to operative position, the outer ends of said jaw members having cam surfaces in inwardly converging relation which, when slidably engaged by a coupler pin entering the V-crotch in a coupling operation, cause the jaw members to be forced apart against the resistance of said spring means to admit the coupler pin to coupled position, whereupon the jaw members close under spring pressure to retain said coupler pin in said V-crotch, a lever disposed for oscillation in said chamber in transverse relation to and between said jaw members and pivoted at its inner end with respect to said housing and extending therefrom for manual oscillation, and a pin on said lever intermediate its ends disposed substantially at right angles to the planes of said jaw members having one end portion slidably engaging on one side the inner longitudinal edge portion of one of said jaw members, and having the other portion slidably engaging on the other side the inner longitudinal edge portion of the other jaw member, said inner longitudinal edge portions being in inwardly converging relationship so that when said lever is pulled to uncoupling position said pin forces said jaw members apart, said lever being thereafter returned to coupling position by said jaw members under the pressure of said spring means.

6. A hitch mechanism as set forth in claim 5 including stop projections on said inner longitudinal edge portions for abutment by said pin to limit closing movement of said jaws.

7. In a hitch mechanism, a housing providing a chamber therein having top and bottom walls in which a V-crotch entrance is provided for reception of a coupler pin, an elongated hook-shaped jaw member pivoted at one end in said chamber inwardly from the V-crotch and swingable laterally relative to the V-crotch to confine a coupler pin in the inner end thereof, spring means urging said jaw member to swing toward said V-crotch, the outer end of said jaw member having an inclined cam surface thereon which, when slidably engaged by a coupler pin entering the V-crotch in a coupling operation, causes the jaw member to be forced away from the V-crotch against the resistance of said spring means to admit the coupler pin to coupled position, whereupon the jaw member closes on the pin under spring pressure to retain it in said V-crotch, a lever disposed for oscillation in said chamber in transverse relation to said jaw member between the hooked outer end and the pivoted inner end thereof and pivoted at its inner end with respect to said housing and extending from said housing for manual oscillation, said jaw member having a second cam surface on its inner longitudinal edge portion intermediate the ends thereof, and a pin on said lever intermediate its ends disposed substantially at right angles to the plane of said jaw member slidably engaging the last mentioned cam surface so that when said lever is pulled to uncoupling position said pin forces said jaw member away from the V-crotch against the resistance of said spring means to release the coupler pin from coupled position, said lever being thereafter returned to coupling position by said jaw member under the pressure of said spring means.

8. A hitch mechanism as set forth in claim 7, including a stop projection on said inner longitudinal edge portion for abutment by said pin to limit closing movement of said jaw.

References Cited in the file of this patent

UNITED STATES PATENTS

| | | |
|---|---|---|
| 713,393 | Buller | Nov. 11, 1902 |
| 752,759 | Crisler | Feb. 23, 1904 |
| 844,522 | Johnson | Feb. 19, 1907 |
| 1,416,020 | Hansen | May 16, 1922 |
| 2,124,467 | Lyman | July 10, 1938 |
| 2,591,916 | Coughman | Apr. 8, 1952 |

FOREIGN PATENTS

| | | |
|---|---|---|
| 603,363 | Germany | Sept. 29, 1934 |